United States Patent [19]

Stolz et al.

[11] Patent Number: 4,529,051
[45] Date of Patent: Jul. 16, 1985

[54] SCALE ASSEMBLY WITH IMPROVED PLATFORM

[75] Inventors: Ronald D. Stolz, Columbus; Benny N. Dillon, Worthington; Frederick H. Weihs, Toledo, all of Ohio

[73] Assignee: Masstron Scale, Inc., Columbus, Ohio

[21] Appl. No.: 533,576

[22] Filed: Sep. 19, 1983

[51] Int. Cl.³ .................... G01G 19/02; G01G 21/22
[52] U.S. Cl. .................................. 177/134; 177/253; 52/334; 52/336
[58] Field of Search ............... 177/134, 253; 52/250, 52/333, 334, 336, 602

[56] References Cited

U.S. PATENT DOCUMENTS

| | | |
|---|---|---|
| 163,551 | 5/1875 | Tyrrell . |
| 1,706,963 | 7/1925 | Reeves . |
| 2,405,116 | 3/1944 | Cullen . |
| 2,838,299 | 6/1958 | Reiser et al. .................... 177/134 X |
| 2,962,275 | 7/1957 | Thurston . |
| 3,181,187 | 5/1961 | Kahn . |
| 3,397,497 | 1/1965 | Shea et al. . |
| 3,564,799 | 2/1971 | Hanson ................................ 52/334 |
| 4,106,249 | 8/1978 | Morton . |
| 4,115,971 | 9/1978 | Varga ............................... 52/250 X |
| 4,210,216 | 7/1980 | Godden .............................. 177/134 |
| 4,258,814 | 3/1981 | Dillon . |
| 4,266,624 | 5/1981 | Dillon . |
| 4,392,537 | 7/1983 | Lundborg .......................... 177/134 |

Primary Examiner—E. A. Goldberg
Assistant Examiner—Patrick W. Foster
Attorney, Agent, or Firm—Yount & Tarolli

[57] ABSTRACT

A scale assembly includes a plurality of force measuring transducers which are connected with an improved platform. The platform has an upper portion which withstands compressive stresses and a lower portion which withstands tensile stresses during the weighing of a load. The upper portion of the platform includes a body of concrete having a corrugated lower major side and a flat upper major side which receives a load to be weighed. The lower portion of the platform includes a metal structure having a plurality of elongated ribs which are disposed in abutting engagement with the corrugated lower major side of the body of concrete. The ribs are connected with a bottom plate which cooperates with the ribs to form elongated cavities. At least a major portion of each of the cavities is disposed within the spatial envelope of the body of concrete to minimize the mass of the concrete. During the weighing of a load, the concrete is subjected to compressive stresses and the bottom plate and ribs are subjected to tensile stresses.

17 Claims, 7 Drawing Figures

SCALE ASSEMBLY WITH IMPROVED PLATFORM

BACKGROUND OF THE INVENTION

This invention relates to a scale assembly and more particularly to a scale assembly having an improved platform.

Weighing scales have been built with metal platforms constructed in a manner generally similar to that disclosed in U.S. Pat. Nos. 4,266,624 and 4,258,814. In addition, it has been suggested that scales could be constructed with platforms having a metal framework and wood deck planking in the manner shown in U.S. Pat. No. 2,962,275. It has also been suggested that part of a scale frame could be formed of reinforced concrete enclosed by sheet metal in the manner disclosed in U.S. Pat. No. 1,706,963.

Although known types of scale platform constructions are more or less suitable, minimizing the weight and cost of these platforms without impairing their strength would represent a substantial improvement.

SUMMARY OF THE PRESENT INVENTION

The present invention provides a scale platform having an upper portion which includes a body of concrete and a lower portion which includes a metal structure. During the weighing of a load, the upper portion of the platform is subjected to compressive stress while the lower portion of the platform is subjected to tensile stress. Since the concrete upper portion of the platform can withstand relatively high compressive stresses and the metal lower portion of the platform can withstand relatively high tensile stresses, the platform is capable of carrying relatively heavy loads.

In order to minimize the weight of the platform and to enahance its ability to withstand tensile stresses, the lower major side of the body of concrete is corrugated and engages longitudinally extending ribs of a corrugated metal structure. The elongated ribs of the metal structure cooperate with a bottom plate connected to lower end portions of the ribs to define cavities which extend upwardly into the body of concrete.

During the application of loads to the platform, the metal structure will tend to move relative to the body of concrete. In order to prevent movement between the metal structure and the body of concrete, anchor assemblies are connected with the ribs and extend upwardly into the body of concrete. Each of the anchor assemblies includes anchor panels which cooperate with main panels of the ribs to grip portions of the body of concrete. In addition, openings with axially tapered rims are formed in the anchor panels. The concrete extends through these openings and is abuttingly engaged by the sides of the axially tapered rim to prevent relative movement between the anchor panels and the body of concrete.

Accordingly, it is an object of this invention to provide a scale assembly having a load receiving platform which is relatively strong, light weight, and inexpensive to fabricate.

Another object of this invention is to provide a new and improved scale assembly having a platform which includes a body of concrete which is subjected to compressive stresses during the weighing of a load and a metal structure which is subjected to tensile stress during the weighing of a load.

Another object of this invention is to provide a new and improved scale assembly having a platform which includes a body of concrete having a corrugated lower side which cooperates with ribs of a metal structure to form cavities which extend upwardly into the body of concrete.

BRIEF DESCRIPTION OF THE DRAWINGS

The foregoing and other objects and features of the present invention will become more apparent upon a consideration of the following description taken in connection with the accompanying drawings wherein.

DESCRIPTION OF ONE SPECIFIC PREFERRED EMBODIMENT OF THE INVENTION

Figure 1:
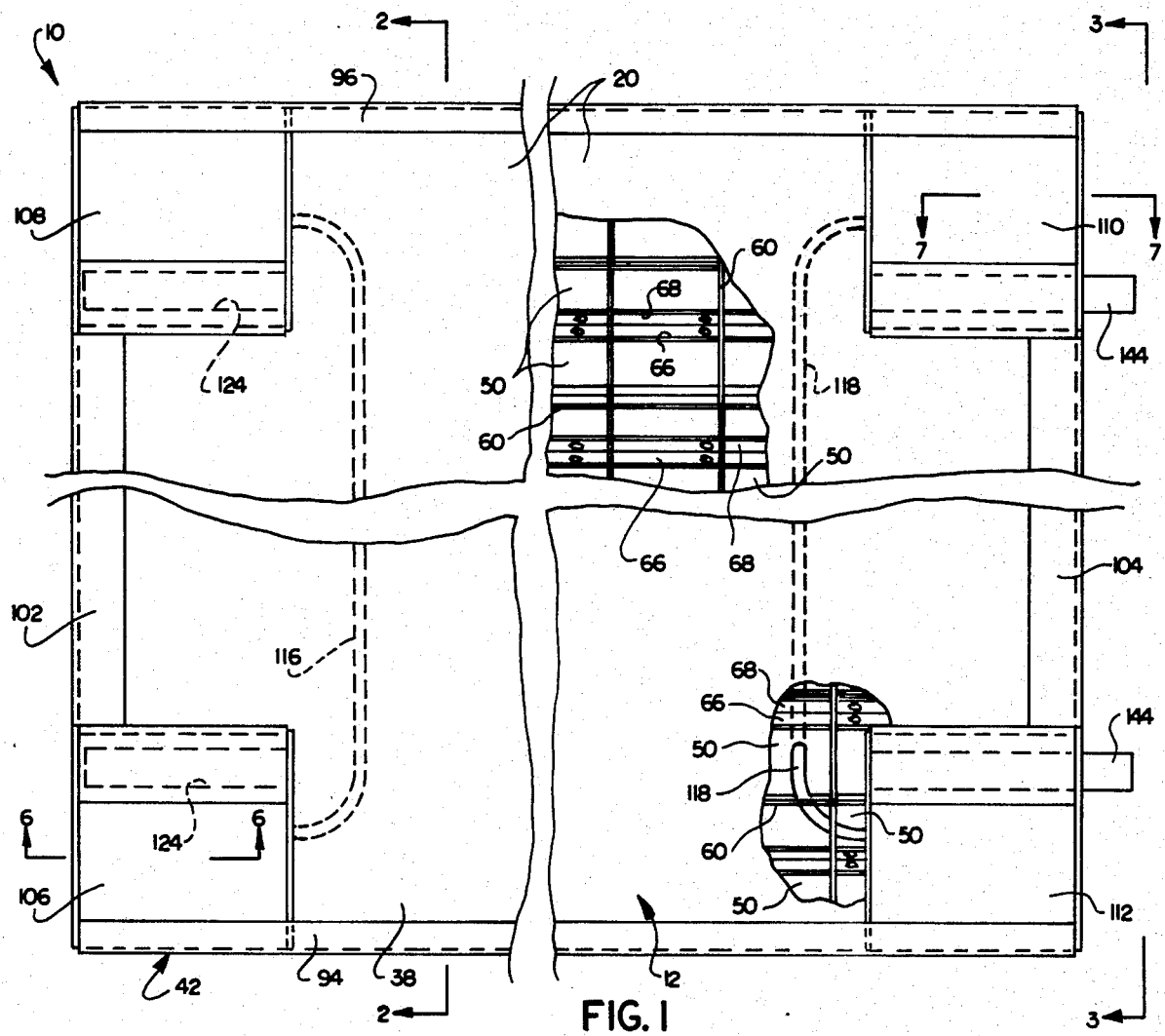
FIG. 1 is a fragmentary top plan view of a scale platform constructed in accordance with the present invention, portions of the platform being broken away to illustrate the construction of the platform.
Figure 2:
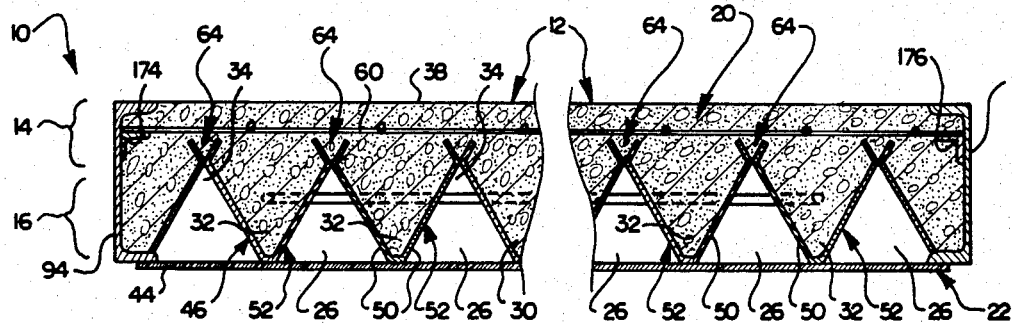
FIG. 2 is a sectional view, taken generally along the line 2—2 of FIG. 1, illustrating the relationship between a body of concrete in an upper portion of the platform and a metal structure in a lower portion of the platform.
Figure 3:
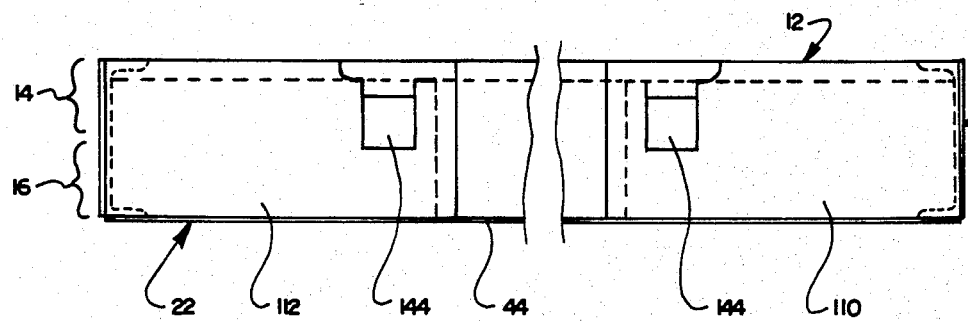
FIG. 3 is an end view, taken generally along the line 3—3 of FIG. 1, further illustrating the construction of the platform.

An improved scale platform 10 constructed in accordance with the present invention is illustrated in FIGS. 1-3. The scale platform 10 has a generally rectangular configuration (FIG. 1) with a flat upper side 12 which receives a load to be weighed. During weighing of the load, an upper portion 14 (FIGS. 2 and 3) of the platform 10 is stressed in compression and a lower portion 16 of the platform is stressed in tension.

In accordance with a feature of the present invention, the upper portion 14 of the platform 10 includes a body 20 of concrete (FIG. 2) and the lower portion 16 of the platform 10 includes a metal structure 22. The body 20 of concrete is relatively strong in compression and can readily withstand the compressive stress applied to the upper portion of the platform 10 during the weighing of a load. Although the metal structure 22 is partially formed of relatively thin steel sheets or plates, the metal structure is relatively strong in tension and can withstand the tensile stress applied to the lower portion 16 of the platform 10 during the weighing of a load.

In accordance with another feature of the present invention, the mass of the platform 10 is minimized by forming a plurality of elongated cavities 26 (FIG. 2) in the platform 10. The cavities 26 are disposed within the spatial envelope of the body 20 of concrete and project upwardly into the body of concrete to reduce the mass of the platform 10. The cavities 26 extend lengthways of the platform 10 throughout the length of the platform.

Figure 4:
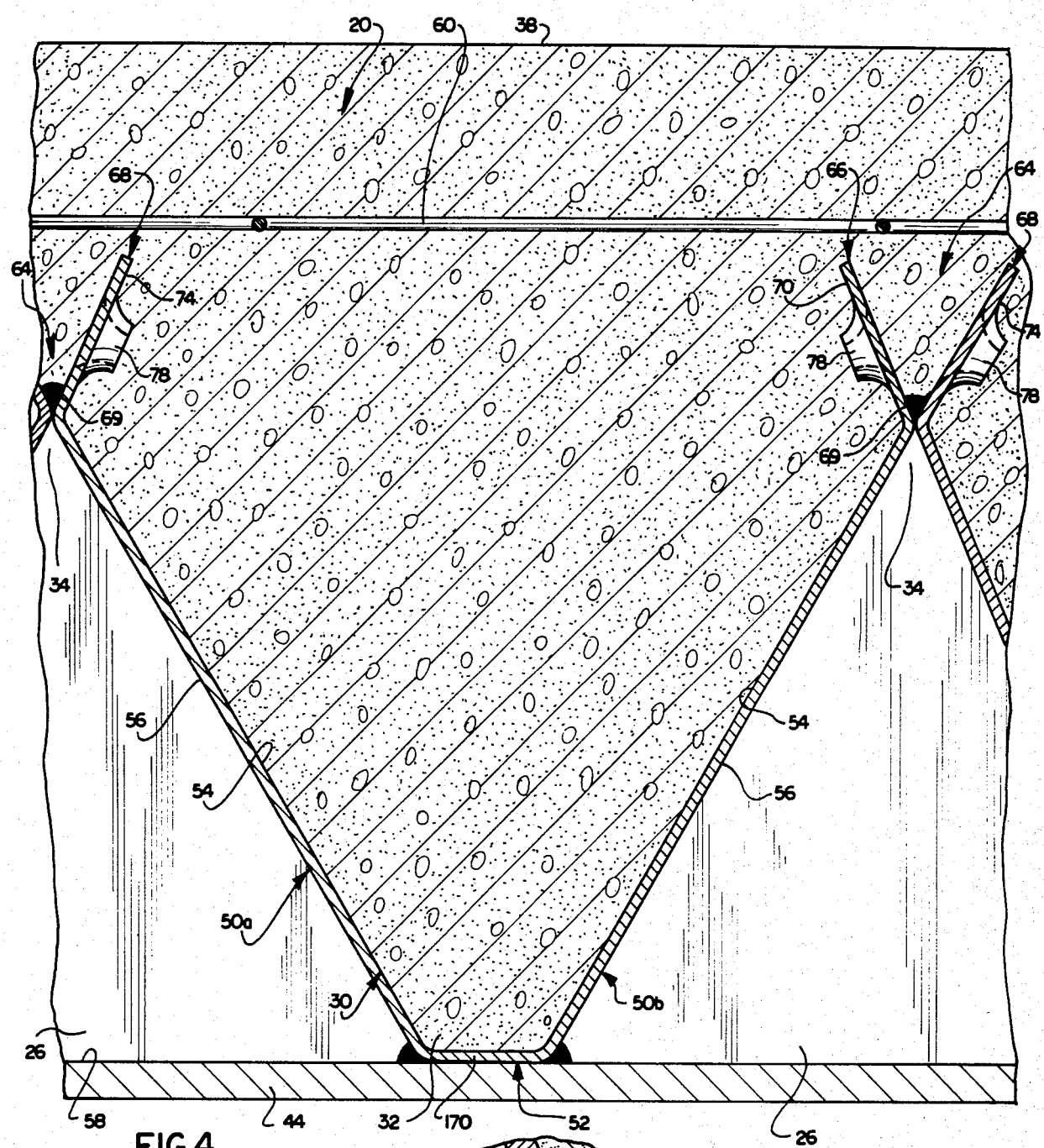
FIG. 4 is an enlarged fragmentary sectional view of a portion of the scale platform of FIG. 2 and illustrating the manner in which longitudinally extending ribs in the metal structure cooperate with the body of concrete.

The metal structure 22 forms a mold for the body 20 of concrete and is strong enough so that reinforcing bars do not have to be placed in the body of concrete. The metal structure 22 shapes the body 20 of concrete so that it has a corrugated lower major side 30 (FIGS. 2 and 4). The lower major side 30 of the body of concrete has alternate downwardly extending ridges or crests 32 and upwardly extending troughs or furrows 34. The crests and troughs 32 and 34 extend lengthways of the rectangular platform 10. The body 20 of concrete has a flat major upper side 38 which forms the large majority of the upper side 12 of the platform 10.

The metal structure 22 includes a rectangular metal frame 42 (FIGS. 1 and 3). A flat steel bottom plate 44 (FIGS. 2 and 3) is connected with the frame 42. The bottom plate 44 extends parallel to the upper side surface 38 of the body 20 of concrete. The bottom plate 44 extends throughout substantially the entire length and width of the platform 10.

A steel rib structure 46 (FIG. 2) is fixedly connected to the bottom plate 44. The steel rib structure 46 is formed of interconnected V-shaped ribs 52. Each of the ribs 52 has a pair of flat main panels 50 which form upwardly diverging legs of the ribs. Inner major side surfaces 54 (FIG. 4) of the main panels 50 abut the corrugated lower major side 30 of the body 20 of concrete. Outer major sides 56 of the main panels 50 cooperate with a flat upper major side 58 of the bottom plate 44 to define the cavities 26. The cavities 26 and V-shaped ribs 52 extend lengthwise of the platform 10.

It is contemplated that the platform 10 may be used in environments where the temperature will vary. In order to minimize thermal stresses in the body 20 of concrete, a heat conductive lattice 60 extends through the body 20 of concrete. The heat conductive lattice 60 is formed of thin metal rods. Although the thin metal rods are relatively ineffective to reinforce the body 20 of concrete, they are effective to conduct heat between the exterior of the platform 10 and a central portion of body 20 of concrete. Since the metal lattice 60 is a relatively good conductor of heat, the temperature on the outer sides of the body 20 of concrete and the central portion of the body of concrete tend to equalized due to the conducting of heat either to or from the central portion of the body of concrete.

In accordance with another feature of the invention, anchor assemblies 64 (FIG. 4) are provided to prevent relative movement between the metal structure 22 and the body 20 of concrete. Each of the anchor assemblies 64 includes a pair of anchor panels 66 and 68. The anchor panels 66 and 68 are formed as one piece with and have the same length as the main panels 50. The anchor panels 68 on the adjacent V-shaped ribs 52 are connected by fillet welds 69. The anchor panels 66 and 68 (FIG. 4) extend upwardly into the body 20 of concrete at the troughs or furrows 34 in the corrugated lower major side 30 of the body of concrete.

The anchor panels 66 and 68 cooperate with the main panels 50 to hold the metal structure 22 against vertical movement relative to the body 20 of concrete. Thus, a major side surface 70 (FIG. 4) of the anchor panel 66 faces toward an inner major side surface 54 of a main panel 50a. This results in a portion of the body 20 of concrete being held or trapped between the major side 70 of the anchor panel 66 and the major side 54 of the main panel 50a.

The concrete which is held between the anchor panel 66 and main panel 50a prevents the body 20 of concrete from moving upwardly relative to metal structure 22 or, conversely, prevents the metal structure 22 from moving downwardly relative to the body of concrete. Due to the gripping action of the anchor panel 66 and main panel 50a, the panel 50b which is disposed between the main panel 50a and the anchor panel 66 (see FIG. 4) is held in firm abutting engagement with the corrugated lower major side 30 of the body 20 of concrete. This prevents bulging or oil canning of the main panel 50b away from the body 20 of concrete when a load is applied to the platform 10.

The other anchor panel 68 cooperates with a main panel 50b in the same manner as previously explained in connection with the anchor panel 66. Thus, the anchor panel 68 has a major side surface 74 which faces toward the opposite main panel 50b. A portion of the body 20 of concrete is held between the major side surface 74 of the anchor panel 68 and the inner major side surface 54 of the main panel 50b. The anchor panels 66 and 68 are of the same length as the main panels 50.

Each of anchor panels 66 and 68 is provided with a series of outwardly projecting retainers 78 which engage the body 20 of concrete to hold the panels against sidewise movement. A retainer 78 (FIG. 5) has an axially tapering circular rim 84 which extends outwardly from the major side surface 70 of the anchor panel 66. The outwardly projecting rim 84 abuts the concrete to hold the anchor panel against endwise movement.

The concrete extends into an axially tapering passage 86 in the retainer 78. Therefore an inner side surface 88 of the rim 84 abuts the body of concrete which extends through the opening 86. Similarly, an outer side surface 90 on the retainer rim 84 also abuts the body 20 of concrete. Therefore, the retainer rim 84 is engaged by the body 20 of concrete to hold the anchor panel 66 against movement relative to the body 20 of concrete. If the opening 86 had been formed in the retainer panel 66 without the axially tapering rim 84, the relatively thin sheet material of the anchor panel 66 would tend to cut through the body 20 of concrete upon the application of forces to the anchor panel tending to shift it relative to the body of concrete.

Figure 5:
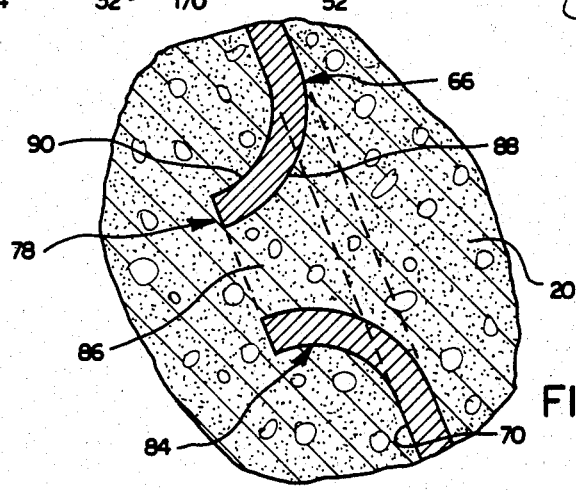
FIG. 5 is an enlarged fragmentary view illustrating the manner in which a tapered rim of an opening in the metal structure engages the body of concrete to hold the concrete and metal structure against relative movement.

Although only a single retainer 78 has been shown in FIG. 5, it should be understood that a linear array of retainers 78 is formed in each of the anchor panels 66 and 68. The linear arrays of retainers extend parallel to the bottom plate 44 and extend throughout the length of the anchor panels 66 and 68. In one specific instance, the retainers 78 had circular openings 86 with a diameter of approximately 0.25 inch. In this specific instance, the openings 86 had centers which were spaced 4 inches apart. Of course, different size openings 86 with different center spacing could be used if desired.

A generally rectangular frame 42 circumscribes the body 20 of concrete and the rib structure 66. Thus, the rectangular frame 42 includes a pair of steel side beams 94 and 96 which extend lengthways of the platform 10. The bottom plate 44 is secured to the bottom of the beams 94 and 96 (see FIG. 3). The upper major side 38 of the body 20 of concrete is cast so as to be level with the top of the beams 94 and 96. A pair of steel end beams 102 and 104 (see FIG. 1) have a generally L-shaped configuration and extend perpendicular to the main beams 94 and 96. The end beams 102 and 104 block the ends of the longitudinally extending cavities.

Rigid rectangular metal boxes 106, 108, 110, and 112 are connected with the frame members 94, 96, 102 and 104. The rigid metal boxes 106-112 form recesses for receiving load measuring transducers.

The load measuring transducers are mounted at the corners of the platform 10. The transducer boxes 106 and 108 at the left (as viewed in FIG. 1) end of the platform 10 are interconnected by a passage in a rigid conduit 116. Similarly, a rigid conduit 118 interconnects the transducer boxes 110 and 112. The conduits 116 and 118 are for cables or fluid conduits, depending upon the type of transducer with which the platform 10 is used.

It is preferred to use shear beam load cells as the force measuring transducers. The shear beam load cells have a known construction and are similar to the load cells which are commercially available from Hottinger, Baldwin Measurements, Inc. of Natick, Mass., U.S.A. The shear beam load cells are mounted in the transducer boxes 106-112 in the same manner disclosed in U.S. Pat. No. 4,266,624.

It is contemplated that the load platform 10 will be used as the first platform of a series of interconnected platforms in the manner disclosed in U.S. Pat. No. 4,266,624. The transducer unit 120 associated with the transducer box 106 is illustrated in FIG. 6.

The transducer unit 120 includes a support block 124 which is fixedly connected with the frame 42. A cantilevered load arm 126 is fixedly connected with the support block 124 by bolts 128. A free end 132 of the load arm 126 is provided with a recess 134 into which a load pin 136 extends. A retaining block 138 is provided with an opening through which the load pin 136 extends into engagement with a base plate 140. Strain gages are connected with the cantilevered load arm 126 to provide an output signal which varies as a function of the magnitude of the load on the platform 10.

Figure 6:
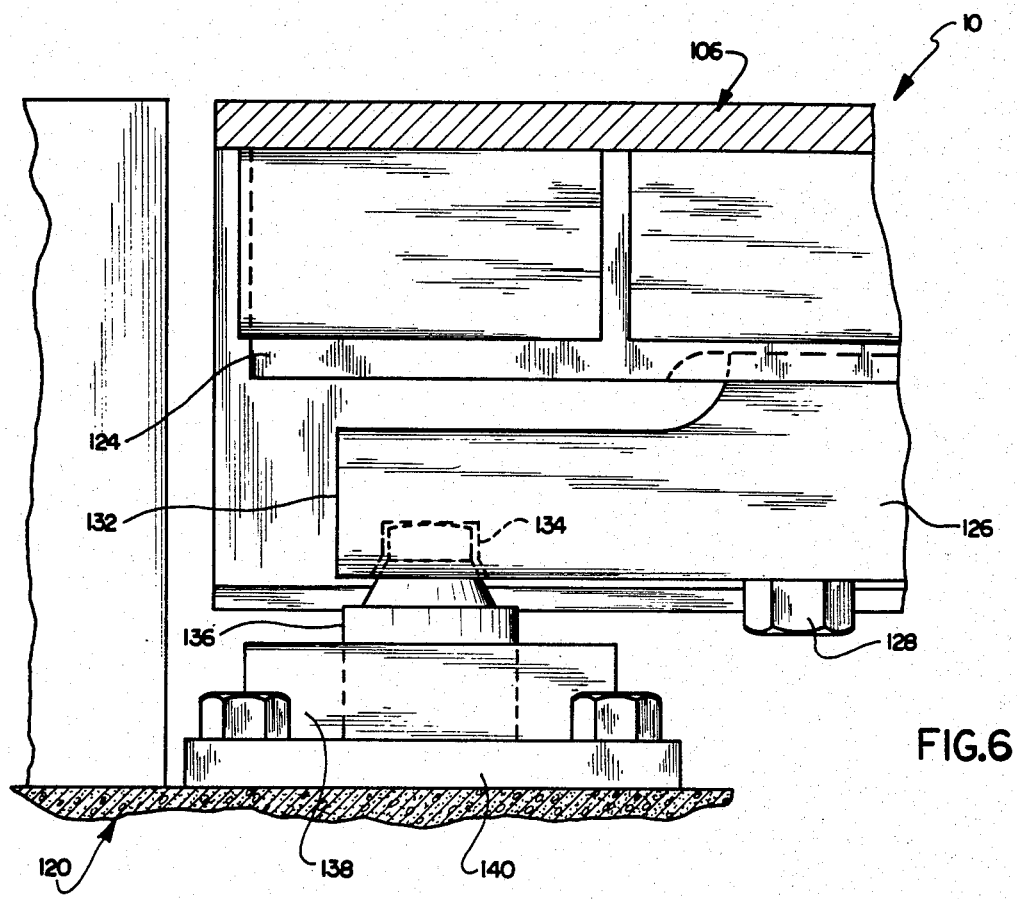
FIG. 6 is a fragmentary sectional view of the manner in which a load measuring transducer unit is mounted at one end of the scale platform of FIG. 1.

Only the transducer unit 120 has been shown in FIG. 6 in association with the transducer box 106. However, a similar transducer unit is associated with the transducer box 108 (FIG. 1).

The opposite end of the platform 10 is connected with a next succeeding platform of the scale assembly. Thus, the transducer box 110 (FIG. 1) has an outwardly projecting support arm 144 which is fixedly connected with the frame 42 of the scale platform 10. The support arm 144 has a free outer end 146 (FIG. 7) with a circular opening into which a pin 148 extends. The pin 148 is received in an opening in a next adjacent platform 10a.

A load measuring transducer unit 150 is associated with the transducer box 110. The transducer unit 150 includes a cantilevered load arm 152 (FIG. 7) which is fixedly connected with the support arm 146 by bolts 154. A recess 156 in a free outer end 158 of the load arm 152 is engaged by a load pin 160. A lower end portion of the load pin 160 extends through an opening in a stationary retaining plate 162 into engagement with a base plate 164.

Figure 7:
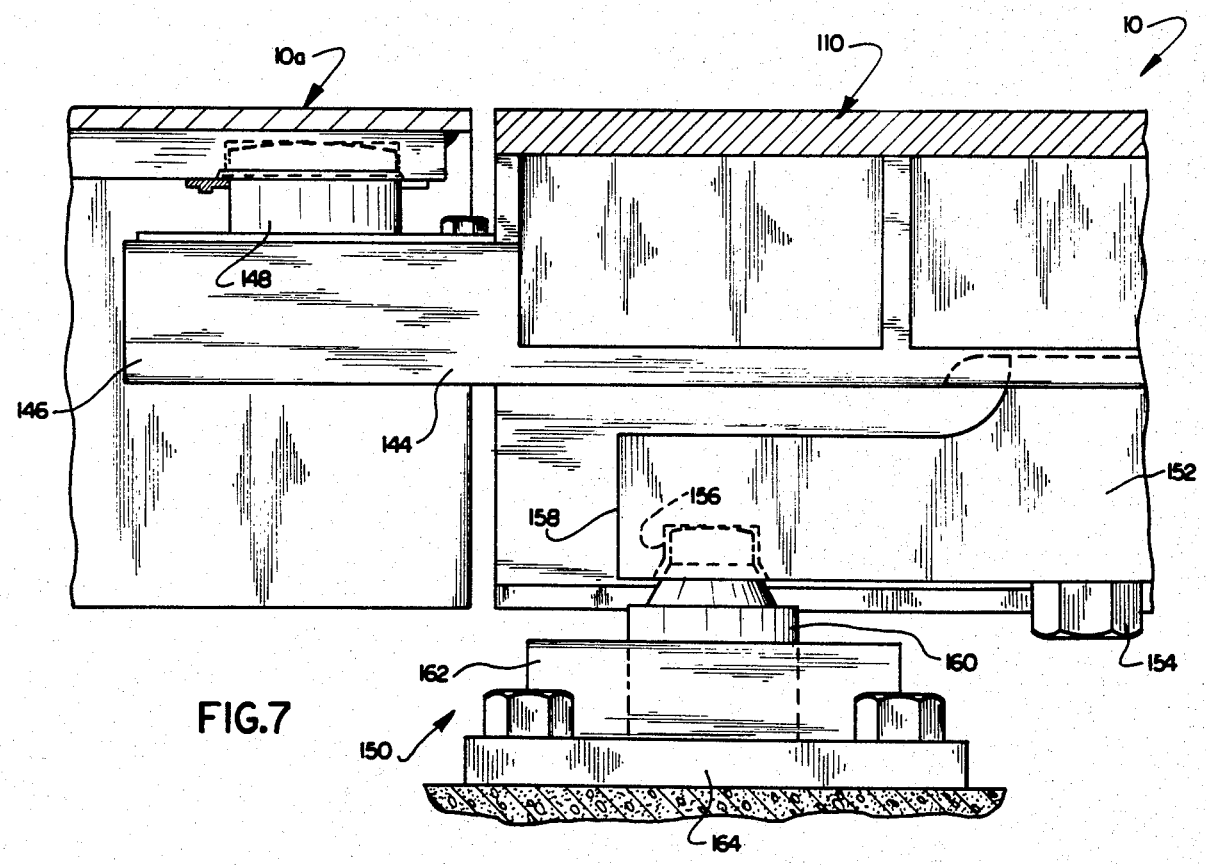
FIG. 7 is a fragmentary sectional view illustrating the manner in which a load measuring transducer unit is mounted at an end of the scale platform opposite from the end shown in FIG. 6.

Only the transducer unit 150 has been shown in FIG. 7 in association with the transducer box 110. However, a similar transducer unit is associated with the transducer box 112. Since the transducers are mounted in the boxes 106-112 in the same manner described in U.S. Pat. No. 4,266,624, the mounting of the transducers will not be further described herein in order to avoid prolixity of description.

When the platform 10 is to be constructed, the rigid frame 42 and transducer boxes 106-112 are fabricated and connected with the bottom plate 44. The steel V-shaped ribs 52 are welded to the upper major side 58 of the bottom plate 44 (see FIG. 4). The ribs are welded to the bottom plate at a connector piece 170 which extends between the lower ends of the main panels 50 of the V-shaped ribs 52. The upper ends of the main panels 50 of the V-shaped sheet of metal ribs 52 are then welded together, at the welds 69 (FIG. 4), to form a unitary structure.

The V-shaped ribs 52 are formed of sheet metal. In one specific instance, the ribs 52 were formed of 16 gauge sheet steel. In this specific instance, the bottom plate 44 was formed of 11 gauge sheet steel. Of course, ribs and a bottom plate of different thicknesses could be used if desired.

The heat conducting lattice 60 is then mounted above the ribs 52. Thus, the lattice 60 is connected to angle irons 174 and 176 (FIG. 2) on the main stringers or beams 94 and 96.

After the V-shaped ribs 52 have been connected with the bottom plate 44 and the heat conducting lattice 60 positioned above the ribs, the metal structure 22 is complete. The structure is then shipped to an installation site where the scale platform is to be used. Concrete is poured, at the installation site, into the upwardly opening V-shaped ribs 52. The frame 44 is filled with concrete to the top of the main beams 94 and 96 and the end beams 102 and 104.

In view of the foregoing description it is apparent that the present invention provides a scale platform 10 having an upper portion 14 which includes a body 20 of concrete and a lower portion 16 which includes a metal structure 22. During the weighing of a load, the upper portion 14 of the platform 10 is subjected to compressive stress while the lower portion 16 of the platform is subjected to tensile stress. Since the concrete upper portion 14 of the platform 10 can withstand relatively high compressive stresses and the metal lower portion 16 of the platform can withstand relatively high tensile stresses, the platform is capable of carrying relatively heavy loads.

In order to minimize the weight of the platform 10 and to enahance its ability to withstand tensile stresses, the lower major side 30 of the body 20 of concrete is corrugated and engages longitudinally extending ribs 52 of the corrugated metal structure 22. The elongated ribs 52 cooperate with a bottom plate 44 connected to the lower end portions of the ribs to define cavities 26 which extend upwardly into the body 20 of concrete.

During the application of loads to the platform 10, the metal structure 22 will tend to move relative to the body 20 of concrete. In order to prevent movement between the metal structure 22 and body 20 of concrete, anchor assemblies 64 are connected with the ribs 52 and extend upwardly into the body 20 of concrete. Each of the anchor assemblies 64 includes anchor panels 66 and 68 which cooperate with main panels 50 of the ribs 52 to grip portions of the body 20 of concrete. In addition, openings 86 with axially tapered rims 84 are formed in the anchor panels 66 and 68. The concrete extends through the openings 86 and is abuttingly engaged by the inner side surface 88 of the axially tapered rim 84 to prevent relative movement between the anchor panels and the body of concrete.

Having described a preferred embodiment of the invention, the following is claimed:

1. A scale assembly for use in weighing a load, said scale assembly comprising transducer means for providing an output indicative of the magnitude of a load, and platform means connected with said transducer means for receiving a load to be weighed, said platform means having an upper portion to withstand compressive stress and a lower portion to withstand tensile stress during the weighing of a load, said upper portion of said platform means including a body of concrete having a corrugated lower major side and a flat upper major side for receiving a load to be weighed, said lower portion of said platform means including a metal structure having a plurality of elongated ribs which extend between opposite end portions of said platform means, each of said ribs having upwardly facing side surfaces disposed in abutting engagement with the corrugated lower major side of said body of concrete and downwardly facing side surfaces which at least partially define a plurality of elongated cavities, each of said elongated ribs having a first main panel section which extends between opposite end portions of said platform means and extends upwardly at an acute angle to a vertical plane from a lowermost portion of the corrugated major side of said body of concrete to an uppermost portion of the corrugated major side of said body of concrete, said first main panel section having an inner major side disposed in abutting engagement with said body of concrete and an outer major side which partially defines one of said elongated cavities, a second main panel section having a lower end portion which is connected with said first main panel section, said second main panel section extending between opposite end portions of said platform means and extending upwardly away from said first main panel section to an uppermost portion of the corrugated major side of said body of concrete, said second main panel section having an inner major side disposed in abutting engagement with said body of concrete and an outer major side which partially defines one of said elongated cavities, and an anchor panel section extending upwardly from an upper end portion of said first main panel section and embedded in said body of concrete, said anchor panel section extending between opposite end portions of said platform means and having a major side which faces toward the inner major side of said second main panel section throughout the length of an elongated rib so that a portion of said body of concrete is disposed between said anchor panel section and said second main panel section throughout the length of an elongated rib to hold said metal structure against movement relative to said body of concrete.

2. A scale assembly as set forth in claim 1 wherein said anchor panel section is formed as one piece with said first main panel section.

3. A scale assembly as set forth in claim 1 wherein each of said elongated ribs further includes a second anchor panel section extending upwardly from an upper end portion of said second main panel section and embedded in said body of concrete, said second anchor panel section extending between opposite end portions of said platform means and having a major side which faces toward the inner major side of said first main panel section throughout the length of an elongated rib so that a portion of said body of concrete is disposed between said second anchor panel section and said first main panel section throughout the length of an elongated rib to hold said metal structure against movement relative to said body of concrete.

4. A scale assembly as set forth in claim 3 wherein said second anchor panel section being formed as one piece with said second main panel section.

5. A scale assembly as set forth in claim 1 including a plurality of rim portions which project outwardly from one of the major sides of said anchor panel section and circumscribe openings extending through said anchor panel section, said body of concrete extending through the openings in said anchor panel section and abutting inner side surface area of said rim portions.

6. A scale assembly as set forth in claim 1 further including surface means for defining a pair of recesses in said platform means at one of the end portions of said platform means, said transducer means including a first transducer disposed in said first recess and a second transducer disposed in said second recess, and means for defining a passage extending through a portion of said body of concrete in a direction transverse to the longitudinal axes of said elongated ribs for receiving conductors connected with at least one of said transducers.

7. A scale assembly as set forth in claim 1 wherein said metal structure further includes a flat plate which extends between opposite end portions of said platform means, and connector means for connecting lower end portions of said first and second main panel sections in each of said elongated ribs with said plate, said plate cooperating with said ribs to further define said cavities.

8. A scale assembly as set forth in claim 1 wherein said first and second main panel sections and said anchor panel section of each of said ribs are formed as one piece having a generally V-shaped configuration, said metal structure further including means for connecting the upper end portion of said first main panel section of one of said ribs with an upper end portion of said second main panel section of an adjacent one of said ribs.

9. A scale assembly for use in weighing a load, said scale assembly comprising transducer means for providing an output indicative of the magnitude of a load, and platform means connected with said transducer means for receiving a load to be weighed, said platform means having an upper portion to withstand compressive stress and a lower portion to withstand tensile stress during the weighing of a load, said upper portion of said platform means including a body of concrete having a corrugated lower major side and a flat upper major side for receiving a load to be weighed, said lower portion of said platform means including a metal structure having a plurality of elongated ribs which extend between opposite end portions of said platform means and have upwardly facing side surfaces disposed in abutting engagement with the corrugated lower major side of said body of concrete and downwardly facing side surfaces which at least partially define a plurality of elongated cavities, said metal structure including a plurality of plate sections which form said ribs, and a plurality of anchor means for preventing relative movement between said plate sections and said body of concrete, each said anchor means including an axially tapered rim portion which projects from and is integrally formed with one of said plate sections and defines an opening extending through said one plate section, said body of concrete extending into said rim portion so that an inner side surface area of said rim portion abuts said body of concrete.

10. A scale assembly as set forth in claim 9 wherein said axially tapered rim portion has an outer side surface area which abuts said body of concrete.

11. A scale assembly as set forth in claim 10 wherein each of said anchor means is disposed at a location between the upper and lower major sides of said body of concrete.

12. A scale assembly as set forth in claim 9 wherein said rim portion has an axial extent which is at least twice as great as the thickness of said plate sections.

13. A scale assembly for use in weighing a load, said scale assembly comprising transducer means for providing an output indicative of the magnitude of a load, and platform means connected with said transducer means for receiving a load to be weighed, said platform means comprising a rectangular frame, a flat bottom plate connected with a lower portion of said frame and extending across substantially the entire length and width of said frame, a plurality of elongated ribs extending between opposite end portions of said frame and having a generally V-shaped cross sectional configuration, a body of concrete cast within said frame and filling said V-shaped ribs, said body of concrete having a corrugated lower major side with a configuration defined by said V-shaped ribs and a flat upper side for receiving a load to be weighed, each of said V-shaped ribs including an apex portion which extends between opposite end portions of said frame and is fixedly connected to an upwardly facing major side of said bottom plate, a pair of main panels which extend between opposite end portions of said frame and which slope upwardly in opposite directions from said apex portion, and a pair of anchor panels which extend between opposite end portions of said frame, each of said main panels of each of said ribs having an outer side surface and an inner side surface which is disposed in abutting engagement with said body of concrete, each of said anchor panels of each of said ribs being connected with an upper edge portion of one of said main panels and having major sides extending transversely to the inner and outer side surfaces of the main panel to which the anchor panel is connected, both of the major sides of each of said anchor panels being disposed in abutting engagement with said body of concrete, a major side on each of the anchor panels of each rib of said plurality of ribs extending upwardly from the upper edge portion of one of the main panels of one of the ribs and facing toward the inner side surface of the other one of the main panels of the one rib so that a portion of the body of concrete is disposed between the major sides of the anchor panels of the one rib and the inner side surfaces of the main panels of the one rib, each one of said ribs being fixedly connected with an adjacent rib at a connection between the upper edge portion of a main panel of the one rib and the upper edge portion of a main panel of the adjacent rib.

14. A scale assembly as set forth in claim 13 wherein the outer side of said main panels and the upper side of said bottom plate define a plurality of cavities which extend between opposite edge portions of said frame.

15. A scale assembly as set forth in claim 13 further including a linear array of openings formed in each of said anchor panels and extending between opposite end portions of said frame, said body of concrete extending through the openings formed in said anchor panels to interconnect said anchor panels and said body of concrete.

16. A scale assembly as set forth in claim 13 further including plate means for at least partially defining a plurality of transducer receiving recesses at one end portion of said frame, means for connecting end portions of a plurality of said ribs with said plate means, and conduit means extending between said transducer receiving recesses, at least a portion of said conduit means extending through said body of concrete.

17. A scale assembly as set forth in claim 13 further including a lattice formed of thin metal rods connected with said frame and disposed in the body of concrete at a location between uppermost portions of said ribs and the upper side of said body of concrete to conduct heat between said frame and a central portion of said body of concrete.

* * * * *